United States Patent
Ohta et al.

(10) Patent No.: US 8,688,342 B2
(45) Date of Patent: Apr. 1, 2014

(54) VIBRATION-RESTRAINING CONTROL APPARATUS FOR VEHICLE

(75) Inventors: Mitsunori Ohta, Machida (JP);
Masahiko Yoshizawa, Odawara (JP);
Yuuki Shiozawa, Sagamihara (JP);
Yosuke Kobayashi, Yokohama (JP);
Akihiro Itoh, Atsugi (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 13/700,512

(22) PCT Filed: May 26, 2011

(86) PCT No.: PCT/JP2011/062050
§ 371 (c)(1),
(2), (4) Date: Nov. 28, 2012

(87) PCT Pub. No.: WO2011/152269
PCT Pub. Date: Dec. 8, 2011

(65) Prior Publication Data
US 2013/0090826 A1    Apr. 11, 2013

(30) Foreign Application Priority Data
May 31, 2010 (JP) .................. 2010-123775

(51) Int. Cl.
*G06F 7/70* (2006.01)
(52) U.S. Cl.
USPC ............................................. 701/70
(58) Field of Classification Search
USPC ............................................. 701/70
See application file for complete search history.

(56) References Cited

U.S. PATENT DOCUMENTS

| | | |
|---|---|---|
| 4,744,589 A | 5/1988 | Buma et al. |
| 4,749,070 A | 6/1988 | Moser et al. |
| 6,026,338 A | 2/2000 | Borschert et al. |
| 7,885,740 B2 | 2/2011 | Izawa et al. |
| 2013/0073145 A1 | 3/2013 | Kobayashi et al. |
| 2013/0080012 A1 | 3/2013 | Kobayashi et al. |

FOREIGN PATENT DOCUMENTS

| | | | |
|---|---|---|---|
| EP | 2078653 A1 * | 7/2009 | ............ B60W 30/20 |
| JP | 62-080108 A | 4/1987 | |
| JP | 08-295151 A | 11/1996 | |
| JP | 11-217200 A | 8/1999 | |
| JP | 2009-127456 A | 6/2009 | |
| JP | 2009-247157 A | 10/2009 | |
| WO | WO 2011/148739 A1 | 12/2011 | |
| WO | WO-2011/152269 A1 | 12/2011 | |

OTHER PUBLICATIONS

USPTO Notice of Allowance, U.S. Appl. No. 13/699,980, Aug. 30, 2013, 13 pages.
USPTO Office Action, U.S. Appl. No. 13/699,980, Mar. 27, 2013, 13 pages.
USPTO Office Action, U.S. Appl. No. 13/699,969, Dec. 19, 2013, 12 pages.

* cited by examiner

*Primary Examiner* — James Trammell
*Assistant Examiner* — Michael D Lang
(74) *Attorney, Agent, or Firm* — Foley & Lardner LLP

(57) ABSTRACT

Predetermined weights are assigned, in accordance with a traveling state, to a first correction toque to suppress a sprung vibration of the vehicle in accordance with a wheel speed, and a second correction toque to suppress the sprung vibration of the vehicle in accordance with a driving/braking torque. With this configuration, it becomes possible to calculate the vibration suppressing torque corresponding to the traveling state.

5 Claims, 9 Drawing Sheets

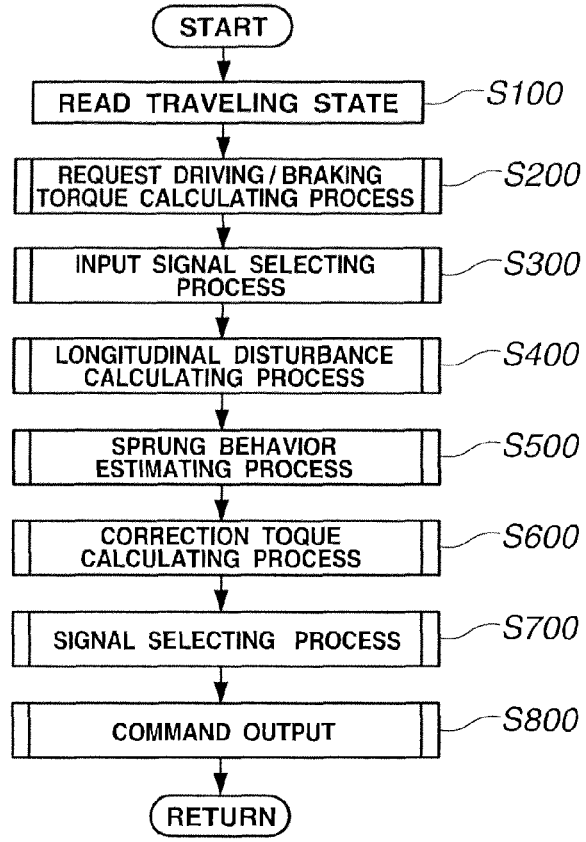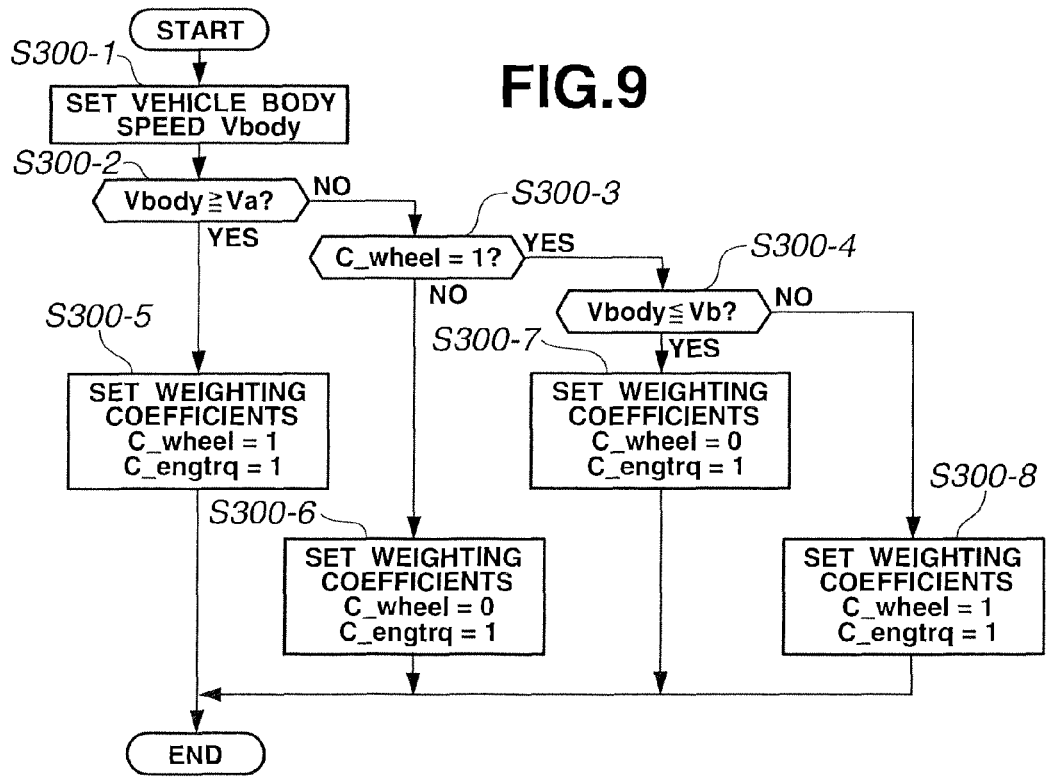

US 8,688,342 B2

VIBRATION-RESTRAINING CONTROL APPARATUS FOR VEHICLE

TECHNICAL FIELD

The present invention relates to a vibration restraining or damping or suppressing control device or apparatus for restraining vibrations produced in a vehicle.

BACKGROUND ART

A patent document 1 discloses a vibration suppressing technique to calculate a vibration suppressing torque for suppressing sprung vibrations by using, as input variables, a driving torque and a wheel speed, and to restrain sprung vibration of the vehicle.

However, according to the technique disclosed in the patent document 1, the vibration suppressing torque is calculated from both of the driving torque and the wheel speed as input variable, irrespective of the traveling state of the vehicle. Therefore, in a driving scene where the deviation of the wheel speed sensed by a wheel speed sensor from the actual wheel speed becomes greater, the vibration suppressing torque is calculated from the wheel speed deviated from the actual wheel speed, and therefore the control system is unable to correct the driving torque to suppress the sprung vibration of the vehicle properly.

PRIOR ART LITERATURE

Patent Document(s)

Patent Document 1: JP2009-247157A

SUMMARY OF THE INVENTION

In view of the above-mentioned problem, it is an object of the present invention to provide a vehicular vibration damping or restraining control apparatus to calculate a vibration suppressing torque in accordance with the traveling state.

In order to achieve the above-mentioned object, according to the present invention, weights are assigned, in accordance with the traveling state, to a first correction toque to suppress a sprung vibration of the vehicle in accordance with a wheel speed, and a second correction toque to suppress the sprung vibration of the vehicle in accordance with a driving/braking torque.

The reliability of the sprung vibration estimated from the wheel speed and the reliability of the sprung vibration estimated from the driving/braking torque vary in dependence on the traveling state. Therefore, the control system can correct the driving force more adequately by varying the weight of the proper vibration suppressing torque and the weight of the improper vibration suppressing torque.

BRIEF DESCRIPTION OF THE DRAWINGS

FIG. 8 is a flowchart showing the sequence of operations of a vibration damping control process in the controller according to the first embodiment.

FIG. 9 is a flowchart showing a weighting coefficient setting process according to the first embodiment.

MODES FOR CARRYING OUT THE INVENTION

Embodiment 1

Figure 1:
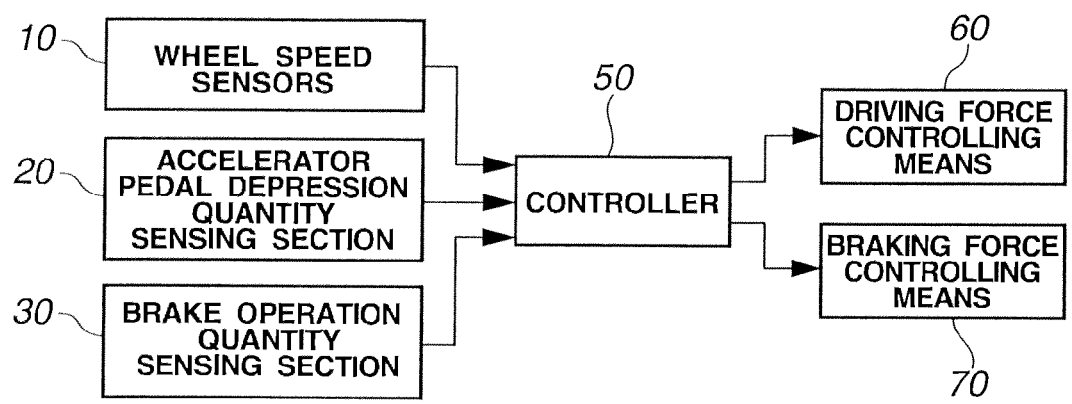
FIG. 1 is a system view showing the structure of a vibration damping or restraining apparatus according to a first embodiment.
Figure 2:
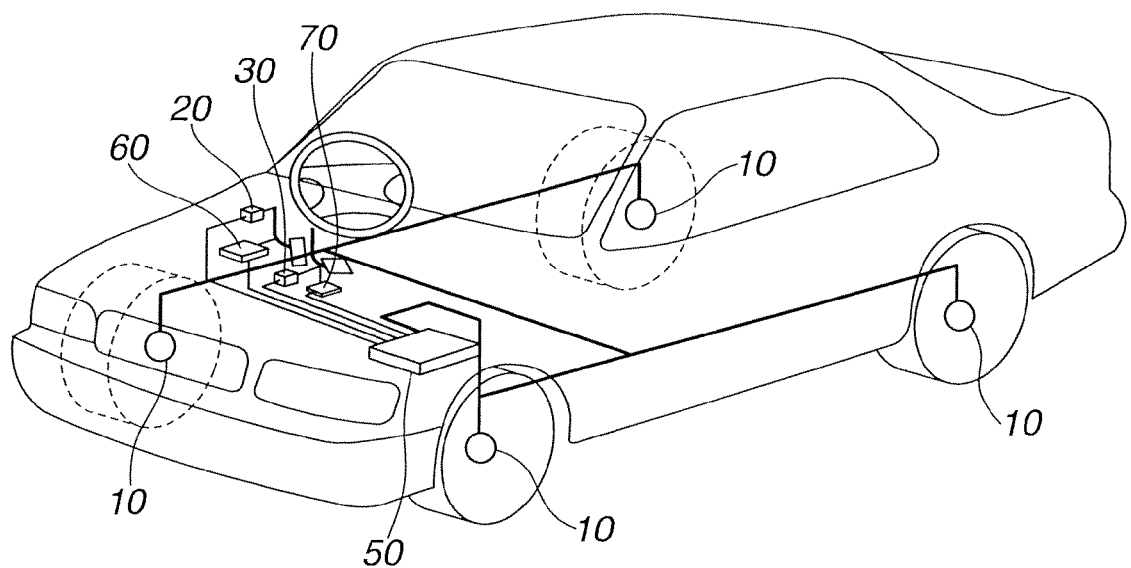
FIG. 2 is a structure view showing a vehicle equipped with the vibration damping apparatus according to the first embodiment.

FIG. 1 is a system view showing the structure of a vibration damping or suppressing apparatus according to an embodiment 1. FIG. 2 is a structure view showing a vehicle equipped with the vibration damping apparatus. First, explanation is directed to the structure of the vibration damping apparatus. Wheel speed sensors 10 sense the wheels speeds of respective wheels of the vehicle from the rpms of the respective wheels. An accelerator pedal depression quantity sensing section 20 senses an accelerator opening degree APO representing the depression quantity of an accelerator pedal by the driver. A brake operation quantity sensing section 30 senses a brake operation quantity S_b by the driver (such as a brake pedal stroke quantity or a depressing force on a brake pedal).

A controller 50 delivers control signals to a driving force controlling means or device 60 and a braking force controlling means or device 70 which are an actuator or actuators of the vibration suppressing apparatus, in accordance with the state variables sensed by the sensors. For example, the braking force controlling means or device 70 may have one of various constructions such as a construction to produce a braking force in a wheel by fluid pressure control, or a construction to press a brake pad onto a brake rotor by controlling a motor, though these are non-limitative examples.

In accordance with the accelerator opening degree APO inputted from accelerator pedal depression quantity sensing section 20 and the brake operation quantity S_b inputted from brake operation quantity sensing section 30, the controller 50 calculates a driving/braking (or longitudinal) torque requested by the driver (request driving/braking torque Te_a, Tw_b) (a request driving/braking torque calculating means or device or 51). Furthermore, in accordance with the wheel speeds of the wheels inputted from wheel speed sensors 10, the controller 50 calculates disturbance acting in a longitudinal direction on the tire of each wheel from a variation of the wheel speed (a longitudinal disturbance calculating means or device 52). Controller 50 estimates a behavior of a vehicle body sprung part from the calculated request driving/braking torque and longitudinal disturbance (a sprung behavior estimating means or device 53). Then, controller 50 calculates a correction torque to suppress a vibration of the estimated vehicle body sprung part behavior (a correction torque calculating means or device 54). An input signal selecting means or device 56 judges the traveling state in accordance with the wheel speed, and sets weights C_engtrq and C_wheel by using a later-mentioned weight setting map. In accordance with the weights set at the input signal selecting means 56, an input signal processing means or device 55 reflects the torque(s) calculated at the correction torque calculating means 54, to the correction torque. Controller 50 outputs a correction toque command calculated by the input signal processing means 55, to the driving force controlling means 60 and the braking force controlling means 70.

Figure 3:
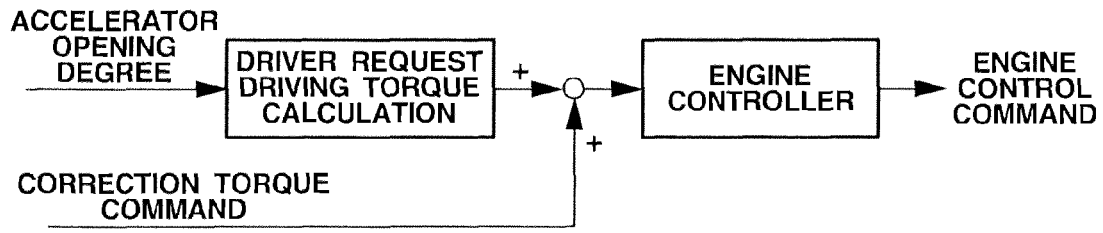
FIG. 3 is a block diagram showing the control structure of a driving force control device according to the first embodiment.
Figure 4:
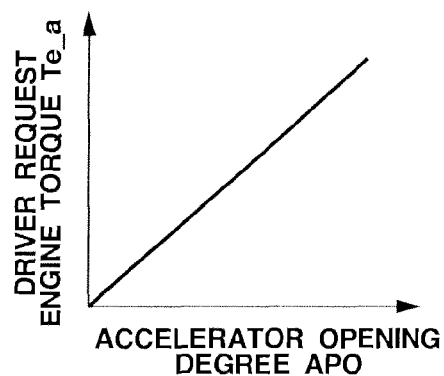
FIG. 4 is a view showing a map representing a driver request engine torque characteristic according to the first embodiment.

FIG. 3 is a block diagram showing the control structure of the driving force control device according to the first embodiment. The driving force control means or device 60 calculates a control command for the engine. The driving force control device calculates the driver request driving torque in accordance with accelerator opening degree APO, and calculates a target driving torque by adding the correction torque command outputted from controller 50, to the driver request driving torque. An engine controller calculates an engine control command in accordance with the target driving torque. FIG. 4 shows a map representing a characteristic of a driver request engine torque. The driver request driving torque is calculated by converting the driver request engine torque read out from the characteristic map defining the relationship between the accelerator opening degree APO and the driver request engine torque Te_a as shown in FIG. 4, into the toque at the driving shaft end, by using a differential gear ratio and a speed ratio of an automatic transmission.

Figure 5:
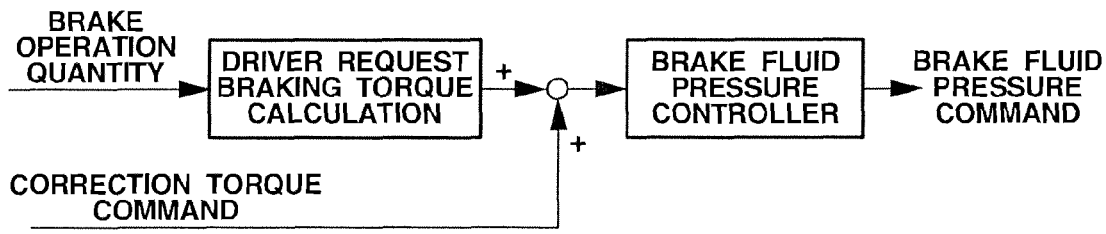
FIG. 5 is a block diagram showing the control structure of a braking force control device according to the first embodiment.
Figure 6:
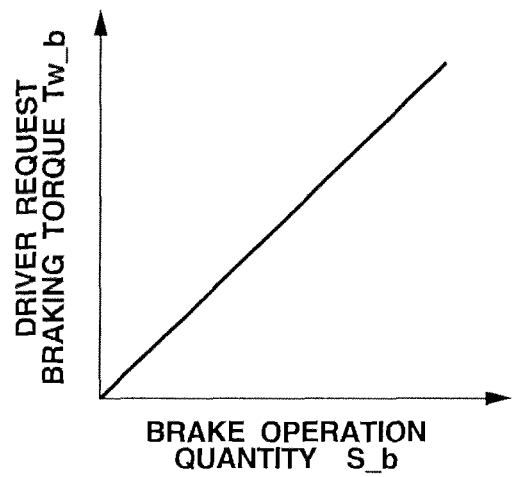
FIG. 6 is a view showing a map representing a driver request braking torque characteristic according to the first embodiment.

FIG. 5 is a block diagram showing the control structure of the braking force control device. The braking force control means or device 70 outputs a brake fluid pressure command. The braking force control device calculates the driver request braking torque Tw_b in accordance with the brake pedal operation quantity S_b, and calculates a target braking torque by adding the correction torque command inputted separately, to the driver request braking torque Tw_b. A brake fluid pressure controller calculates a brake fluid command in accordance with the target braking torque. FIG. 6 shows a map representing a characteristic of the driver request braking torque. The driver request braking torque is calculated by reading out the driver request braking torque from the characteristic map defining the relationship between the brake operation quantity S_b and the driver request braking torque as shown in FIG. 6.

Figure 7:
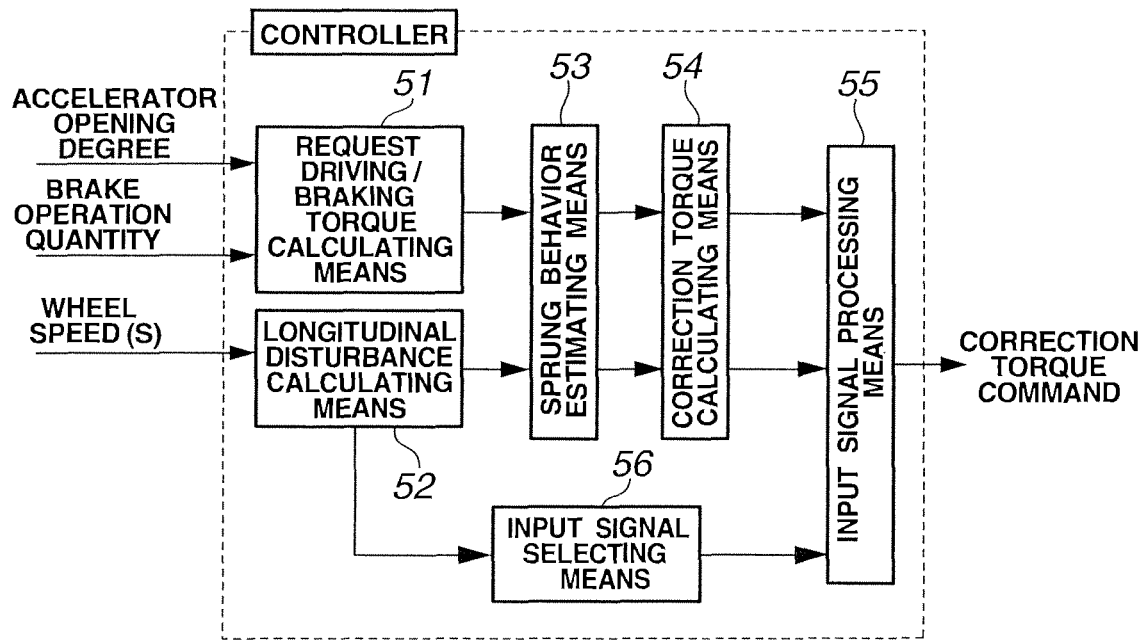
FIG. 7 is a block diagram showing operation performed in a controller in the vibration damping apparatus.

FIG. 7 is a block diagram showing operations performed by the controller in the vibration restraining control apparatus according to the first embodiment. A request driving/braking torque calculating means or device 51 receives the signals from the accelerator pedal depression quantity sensing section 20 and the brake operation quantity sensing section 30, and calculates the driving/braking torque requested by the driver. A longitudinal disturbance calculating means or device 52 calculates a longitudinal (or front and rear) disturbance acting on the tire of each wheel in the longitudinal or front and rear direction, from variation of the wheel speed of each wheel, by using the wheel speed of each wheel inputted from wheel speed sensor 10. A sprung behavior estimating means or device 53 estimates a behavior of the vehicle body sprung part from the request driving/braking torque calculated by the request driving/braking torque calculating means or device 51 and the longitudinal disturbance calculated by the longitudinal disturbance calculating means 52.

Correction torque calculating means or device 54 calculates the correction torque to suppress each vibration of the vehicle body sprung part estimated by sprung behavior estimating means 53, due to the request driving/braking torque and the longitudinal disturbance. An input signal processing means or device 55 calculates and outputs a correction torque command from a correction toque based on the request driving/braking torque as an input, calculated by the correction toque calculating means 54, a correction toque based on the longitudinal disturbance, calculated by the correction torque calculating means 54, and weight(s) set by an input signal selecting means or device 56.

Figure 10:
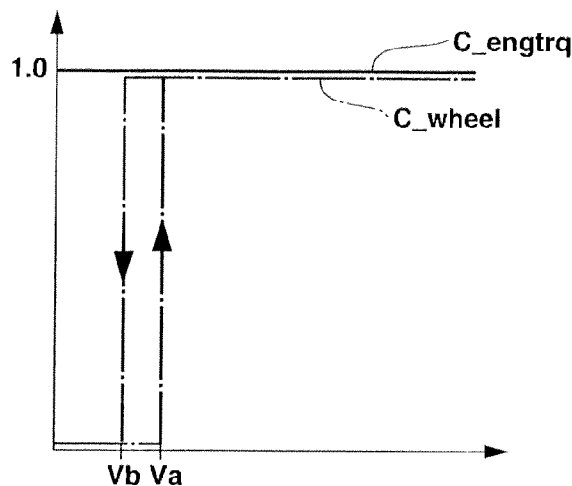
FIG. 10 is a view showing a weight setting map in the first embodiment.

FIGS. 8~10 show operations of the vibration restraining control system according to the first embodiment. FIG. 8 is a flowchart showing the sequence of steps in a vibration damping or restraining control process in the controller according to the first embodiment. This control process is performed repetitively at regular time intervals of a predetermined length, for example 10 msec.

At a step S100, the controller reads the traveling or running state. The traveling state is information on operating condition of the driver and running conditions of the host vehicle which is the vehicle equipped with this control system. In this example, the controller reads the wheel speeds of the wheels sensed by wheel speed sensors 10, the accelerator opening degree APO sensed by accelerator pedal depression quantity sensing section 20 and the brake operation quantity S_b sensed by brake operation quantity sensing section 30.

At a step S200, the controller calculates the driver request driving/braking torque Tw in accordance with the driver' operating conditions read at S100, in a following manner.

The driver request engine torque Te_a is determined from accelerator opening degree APO by readout from the characteristic map defining the relationship between the accelerator opening degree and the driver request engine torque as shown in FIG. 4.

$$Te\_a = \mathrm{map}(APO)$$

The driver request driving torque Tw_a is calculated by converting the thus-determined driver request engine torque Te_a, into the driving shaft torque, by using the differential gear ratio Kdif and the gear ratio Kat of the automatic transmission.

$$Tw\_a = (1/(Kdf \cdot Kat)) \cdot Te\_a$$

Similarly, the driver request braking torque Tw_b is determined from the operation quantity S_b of the brake pedal, according to the characteristic map defining the relationship between the brake operation quantity and the driver request braking torque as shown in FIG. 6.

The request driving/braking torque Tw is calculated from the calculated driver request driving torque Tw_a and the driver request braking torque Tw_b according to a following equation (corresponding to a driving/braking torque sensing means or device).

$$Tw = Tw\_a - Tw\_b$$

At a step S300, the controller sets a weighting coefficient for the input signal in accordance with the traveling state read at step S100 (corresponding to the input signal selecting means 56). FIG. 9 is a flowchart showing a weighting coefficient setting process according to the first embodiment.

At a step S300-1, the controller calculates a vehicle body speed Vbody from the wheel speeds of the wheels obtained by reading. For example, the vehicle body speed Vbody is calculated from an average of two wheel speeds of the non-drive wheels (the two rear wheels in the case of an FF vehicle).

At a step S300-2, the controller compares the vehicle body speed Vbody with a preliminarily set weighting changeover vehicle speed Va. When a relationship of Vbody≥Va is satisfied, then the controller proceeds to a step S300-5. At step S300-5, the controller sets a weight C_wheel for the wheel speed to one, and sets a weight C_engtrq for the engine torque to one. Then, the controller terminates the process of FIG. 9. When the relationship of Vbody≥Va is not satisfied, then the controller proceeds to a step S300-3. When the weight C_wheel is set equal to zero, then the controller sets the weight C_wheel for the wheel speed to 0, and sets the weight C_engtrq for the engine torque to one. Then, the controller terminates the process.

When the weight C_wheel is set equal to one, then the controller proceeds to a step S300-4, and compares the vehicle body speed Vbody with a preliminarily set weighting changeover vehicle speed Vb. When a relationship of Vbody≤Vb is not satisfied, the controller proceeds to a step S300-8, and sets the weight C_wheel for the wheel speed to one, and sets the weight C_engtrq for the engine torque to one. Then, the controller terminates the process. When the relationship of Vbody≤Vb is satisfied, the controller proceeds to a step S300-7, sets the weight C_wheel for the wheel speed to zero, and sets the weight C_engtrq for the engine torque to one. Then, the controller terminates the process. The weighting changeover vehicle speeds Va and Vb are set at speeds in a very low speed region (including a vehicle starting operation), for example, $$Va = 10 (\text{Km/h}) \text{ and } Vb = 5 (\text{km/h}).$$

Figure 11:
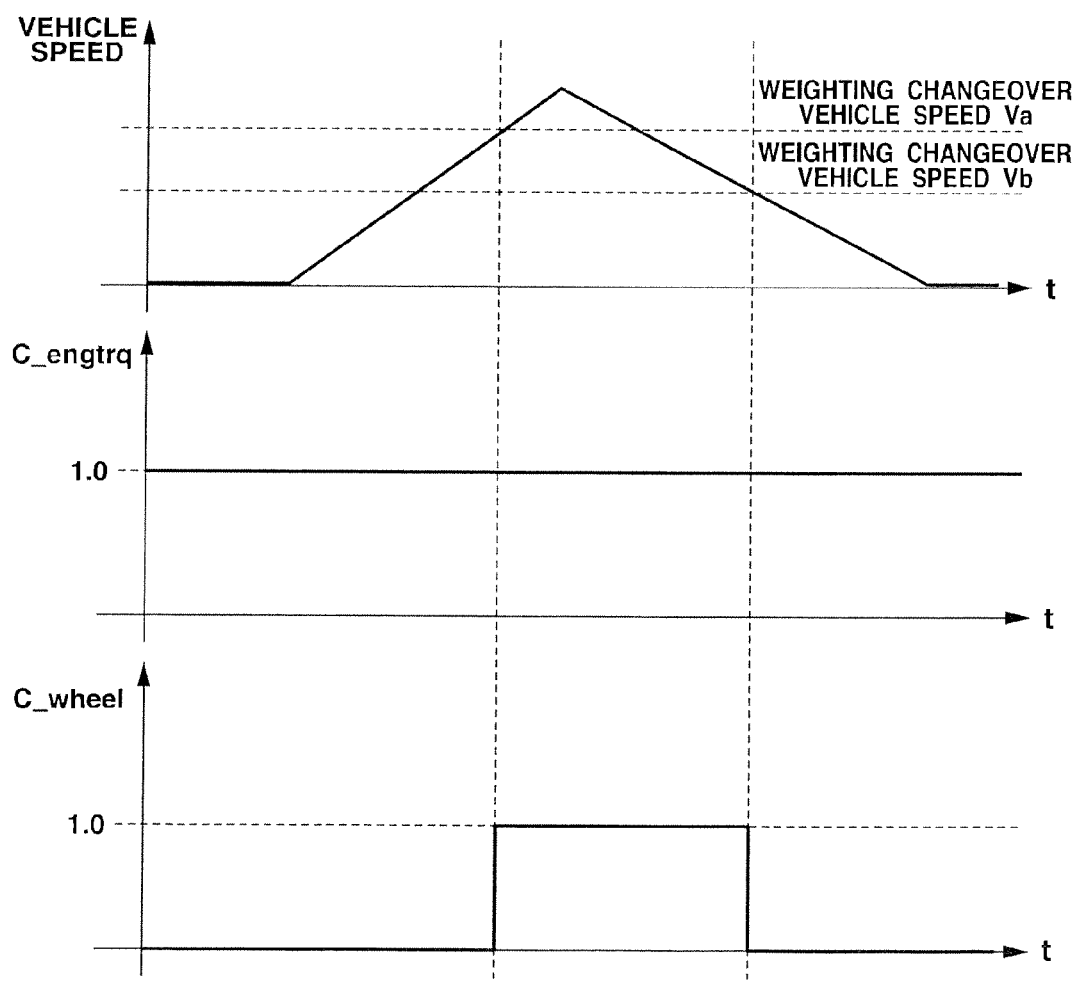
FIG. 11 is a time chart illustrating a weight setting process in the first embodiment.

FIG. 10 is a weight setting map according to the first embodiment, and FIG. 11 is a time chart showing a weight setting process according to the first embodiment. The weight C_engtrq for the engine torque is set always equal to one in the entire vehicle speed region. On the other hand, the weight C_wheel for the wheel speed is set equal to zero in the very low vehicle speed region such as the case in the starting operation, and set to one when the vehicle speed V exceeds the weighting changeover vehicle speed Va. When the vehicle speed decreases and becomes lower than the weighting changeover vehicle speed Vb (<Va), then the weight C_wheel is set to zero. In this way, the control system prevents hunting at the time of weight changeover by performing the weight changeover with a hysteresis in the weight changeover characteristic for the input signal.

At a step S400, the controller calculates the longitudinal disturbance to be inputted to a later-mentioned motion model, in accordance with the wheel speeds of the wheels read at S100. The longitudinal disturbance in the longitudinal direction or front and rear direction is a force inputted to each wheel from the road surface. The longitudinal disturbance can be calculated in a following manner.

A wheel speed of each wheel with respect to the vehicle body is calculated by removing an actual vehicle speed component Vbody from each of the sensed wheel speeds $Vw_{FR}$, $Vw_{FL}$, $Vw_{RR}$ and $Vw_{RL}$. A wheel acceleration of each wheel is calculated by time differentiation by determining a difference between a current value and a previous value of the wheel speed. Each of the front and rear longitudinal disturbances ΔFf and ΔFr of the front and rear wheels are calculated by multiplying the calculated wheel acceleration of each wheel by an unsprung mass.

At a next step S500, the controller estimates the sprung behavior from the request driving/braking torque Tw calculated at S200 and the longitudinal disturbances ΔFf and ΔFr calculated at S400.

Figure 12:
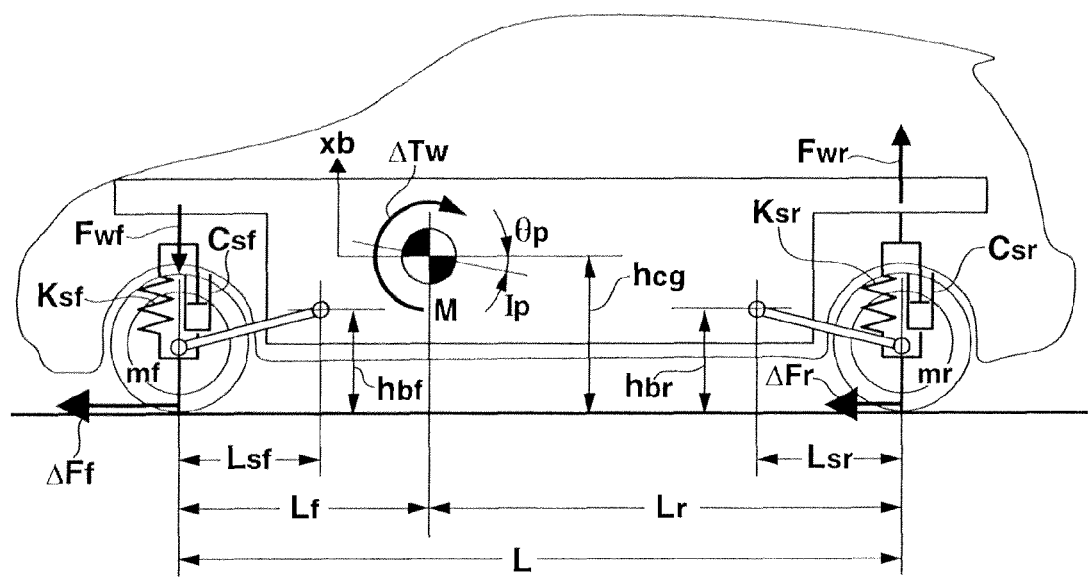
FIG. 12 is a schematic view showing a vehicle motion model in the first embodiment.

First, explanation is direction to the motion model in the first embodiment. FIG. 12 is a schematic view showing a vehicle motion model. This vehicle motion model is a front and rear two wheel model having front and rear suspensions with respect to the vehicle body. This vehicle motion model has, as parameters, a driving/braking torque variation ΔTw produced in the vehicle, the longitudinal disturbance ΔFf produced in the front wheel in dependence on road surface condition variation, driving/braking force variation and steering operation, and the longitudinal disturbance ΔFr produced in the rear wheel. This model is composed of suspension models having spring-damper system, corresponding to the front wheel and the rear wheel, and a vehicle body sprung model representing the quantity of movement, or displacement, of the center of gravity of the vehicle body.

Next, explanation is given, by the use of the vehicle model, about a situation where a driving/braking torque variation is produced in the vehicle, and a longitudinal disturbance is produced by addition, to a tire, of at least one of a road surface condition variation, a driving/braking force variation and a steering operation.

When at least one of the driving/braking torque variation ΔTw, and the longitudinal disturbances ΔFf and ΔFr is produced in the vehicle body, the vehicle body is rotated by an angle θp about the pitching axis, and at the same time, and the center of gravity is moved through an up and down displacement xb. The driving/braking torque variation ΔTw is calculated from a difference between the driving/braking torque $\Delta Tw_n$ calculated from the driver's accelerator operation and brake operation, and a previous value $\Delta Tw_{n-1}$ of the driving/braking toque.

Following signs or symbols are used: a spring constant Ksf and a damping constant Csf of the front wheel's side suspension; a spring constant Ksr and a damping constant Csr of the rear wheel's side suspension; a link length Lsf and a link center height hbf of the front wheel's side suspension; a link length Lsr and a link center height hbr of the rear wheel's side suspension; a pitching inertia moment Ip of the vehicle body, a distance Lf between the front wheel and the pitching axis, a distance Lr between the rear wheel and the pitching axis, a height hcg of the center of gravity, and a sprung mass M. In this specification, for convenience of notation, in the case of the vector notation of each parameter, the time derivative d(parameter)/dt is expressed by a dot over the parameter in some cases. These two different notations are synonymous.

In this case, a motion equation, or equation of motion, of the up down vibration of the vehicle body is expressed as:

$$M \cdot (d^2 xb / dt^2) = \\ -Ksf(xb + Lf \cdot \theta p) - Csf(dxb/dt + Lf \cdot d\theta p/dt) - Ksr(xb - Lr \cdot \theta p) - \\ Csf(dxb/dt - Lr \cdot d\theta p/dt) - (hbf/Lsf)\Delta Ff + (hbr/Lsr)\Delta Fr$$

Moreover, a motion equation, or equation of motion, of the pitching vibration of the vehicle body is expressed as:

$$Ip \cdot (d^2\theta p/dt^2) =$$
$$-Lf \cdot Ksf(xb + Lf \cdot \theta p) - Lf \cdot Csf(dxb/dt + Lf \cdot d\theta p/dt) +$$
$$Lr \cdot Ksr(xb - Lr \cdot \theta p) + Lr \cdot Csf(dxb/dt - Lr \cdot d\theta p/dt) -$$
$$\{hcg - (Lf - Lsf)hbf/Lsf\}\Delta Ff + \{hcg - (Lr - Lsr)hbr/Lsr\}\Delta Fr$$

By converting these two motion equations into a state equation by setting x1=xb, x2=dxb/dt, x3=θp and x4=dθp/dt, a following expression is obtained:

$$dx/dt = Ax + Bu$$

In this equation, each element is expressed as follows:

$$A = \begin{bmatrix} 0 & 1 & 0 & 0 \\ ab1 & ab2 & ab3 & ab4 \\ 0 & 0 & 1 & 0 \\ bb1 & bb2 & bb3 & bb4 \end{bmatrix},$$ [Math 1]

$$B = \begin{bmatrix} 0 & 0 & 0 \\ p1 & p2 & 0 \\ 0 & 0 & 0 \\ p3 & p4 & q \end{bmatrix}, x = \begin{bmatrix} xb \\ \dot{x}b \\ \theta p \\ \dot{\theta}p \end{bmatrix}, u = \begin{bmatrix} \Delta Ff \\ \Delta Fr \\ \Delta Tw \end{bmatrix}$$

$ab1 = -(Ksf + Ksr)/M$ $ab2 = -(Csf + Cst)/M$ $ab3 = -(Lf \cdot Ksf - Lr \cdot Ksr)/M$ $ab4 = -(Lf \cdot Csf - Lr \cdot Csr)/M$ $bb1 = -(Lf \cdot Ksf - Lr \cdot Ksr)/Ip$ $bb2 = -(Lf \cdot Csf - Lr \cdot Csr)/Ip$ $bb3 = -(Lf^2 \cdot Ksf - Lr^2 \cdot Ksr)/Ip$ $bb4 = -(Lf^2 \cdot Csf - Lr^2 \cdot Csr)/Ip$ $p1 = -hbf/M/Lsf$ $p2 = hbr/M/Lsr$ $p3 = hcg/Ip - (Lf - Lsf)hbf/Lsf/Ip$ $p4 = hcg/Ip - (Lr - Lsr)hbr/Lsr/Ip$ $q = 1/Ip$ Furthermore, the above-mentioned state equation is divided into a feed forward term (F/F term) receiving, as input, the driving/braking torque, and a feed back term (F/B term) receiving, as input, front wheel and rear wheel running disturbances, by the input signal.

The feed forward term is expressed as:

$$\dot{x} = Ax + B_{FF} \cdot \Delta Tw, B_{FF} = \begin{bmatrix} 0 \\ 0 \\ 0 \\ q \end{bmatrix}$$ [Math 2]

The feed back term is expressed as:

$$\dot{x} = Ax + B_{FB} \cdot \begin{bmatrix} \Delta Ff \\ \Delta Fr \end{bmatrix}, B_{FB} = \begin{bmatrix} 0 & 0 \\ p1 & p2 \\ 0 & 0 \\ p3 & p4 \end{bmatrix}$$ [Math 3]

By determining x, it is possible to estimate the behavior of the vehicle body sprung part by the driving/braking torque variation ΔTw and the longitudinal disturbances ΔFf and ΔFr.

At a step S600, the controller calculates a correction torque dTw* to suppress vehicle body vibration, in accordance with the sprung behavior estimated at S500. Following operations are performed in step S500.

The controller calculates the correction torque dTw* to be fed back to the request driving/braking torque, from the respective sprung behaviors x with respect to the variation component ΔTw of the request driving/braking torque Tw calculated at S200 and the front and rear wheel longitudinal disturbances ΔFf and ΔFr. In this case, the feedback gain is determined so as to reduce vibrations of dxb/dt and dθp/dt. When, for example, the feedback gain is calculated to decrease dxb/dt in the feed back term, a weighting matrix is set as:

$$Q_{xb\_FB} = \begin{bmatrix} 1 & 0 & 0 & 0 \\ 0 & 3e10 & 0 & 0 \\ 0 & 0 & 1 & 0 \\ 0 & 0 & 0 & 1 \end{bmatrix}, R_{xb\_FB} = \begin{bmatrix} 1 & 0 \\ 0 & 1e15 \end{bmatrix}$$ [Math 4]

And, a control input is an input to minimize J in a following equation.

$$J = \int_0^\infty (x^T(t)Q_{xb\_FB}x(t) + u^T(t)R_{xb\_FB}u(t))dt$$ [Math 5]

The solution is given by a mathematical expression 7, on the basis of a positive symmetric solution p of a Riccati algebraic equation expressed as:

$$A^T p + pA - pBR_{xb\_FB}^{-1}B^T p + Q_{xb\_FB} = 0$$ [Math 6]

$$u(t) = -F_{xb\_FB}x(t), F_{xb\_FB} = R_{xb\_FB}B^T p$$ [Math 7]

In this expression, $F_{xb\_FB}$ is a feedback gain matrix with respect to dxb/dt in the feed back term.

It is possible to calculate a feedback gain $F_{thp\_FB}$ to reduce vibration of dθp/dt in the feedback term, and feedback gains Fxb_FF and Fthp_FF in the feed forward term to reduce dxb/dt and dθp/dt, respectively, in the same manner.

In the case of the feedback gain $F_{thp\_FB}$ to reduce the vibration of dθp/dt in the feed back term, a weighting matrix is set as:

$$Q_{thp\_FB} = \begin{bmatrix} 1 & 0 & 0 & 0 \\ 0 & 1 & 0 & 0 \\ 0 & 0 & 1 & 0 \\ 0 & 0 & 0 & 5e10 \end{bmatrix}, R_{thp\_FB} = \begin{bmatrix} 1 & 0 \\ 0 & 1e15 \end{bmatrix}$$ [Math 8]

The feedback gain $F_{thp\_FB}$ to reduce the vibration of dθp/dt in the feed back term is calculated by, $$F_{thp\_FB} = R_{thp\_FB}B^T p$$ [Math 9]

Similarly, in the case of the feedback gain $F_{xb\_FF}$ to reduce dxb/dt in the feed forward term, a weighting matrix is set as:

$$Q_{xb\_FF} = \begin{bmatrix} 1 & 0 & 0 & 0 \\ 0 & 1e9 & 0 & 0 \\ 0 & 0 & 1 & 0 \\ 0 & 0 & 0 & 1 \end{bmatrix}, R_{xb\_FF} = [1] \quad \text{[Math 10]}$$

The feedback gain $F_{xb\_FF}$ to reduce dxb/dt in the feed forward term is calculated by, $$F_{xb\_FF} = R_{xb\_FF} B^T p \quad \text{[Math 11]}$$

In the case of the feedback gain $F_{xb\_FF}$ to reduce dxb/dt, dθp/dt in the feed forward term, a weighting matrix is set as:

$$Q_{thp\_FB} = \begin{bmatrix} 1 & 0 & 0 & 0 \\ 0 & 1 & 0 & 0 \\ 0 & 0 & 1 & 0 \\ 0 & 0 & 0 & 1e9 \end{bmatrix}, R_{thp\_FB} = [1] \quad \text{[Math 12]}$$

The feedback gain to reduce dθp/dt in the feed forward term is calculated by, $$F_{thp\_FF} = R_{thp\_FF} B^T p \quad \text{[Math 13]}$$

This is a method of optimal regulator. However, it is optional to employ a design by another method such as pole assignment.

The feedforward term and feedback term are expressed by weighting the correction toques determined by the above-mentioned four equations, and rearranging four weighted correction torques Tw_thp_ff, Tw_xb_ff, Tw_thp_fb and Tw_xb_fb.

Tw_ff=Tw_thp_ff+Tw_xb_ff (corresponding to a second correction torque)

Tw_fb=Tw_thp_fb+Tw_xb_fb (corresponding to a first correction torque)

At a step S700, the controller calculates a correction driving/braking torque Tw_stab to be fed back to the request driving/braking torque by performing a weighting operation to the feedback term correction torque Tw_fb and the feedforward term correction torque Tw_ff calculated at step S600. In this example, the correction driving/braking torque Tw_staqb is calculated by multiplication by the weighting coefficients set at step S300 and addition as expressed by a following equation (corresponding to the input signal processing means 55).

Tw_stab=C_engtrq·Tw_ff+TC_wheel·Tw_fb

At step S800, the controller sets the correction driving/braking torque Tw_stab calculated at step S700, as the correction torque command dTw*, and outputs the correction torque command dTw* to the driving force controlling means 60 and the braking force controlling means 70. Then, the controller terminates the current cycle of the process.

(Operations with Weighting)

In the very low vehicle speed region, the sensing accuracy of the wheel speed sensors is low, and hence there is a very high possibility that a deviation between the wheel speed of each wheel inputted from the wheel speed sensors 10 and the actual vehicle speed becomes great. If the vibration damping control is performed on the basis of the deviated wheel speed or speeds, it is difficult to calculate an adequate vibration damping torque from a state deviated from an actual vibrating state of the vehicle. Therefore, when it is judged that there is a deviation between the signal of the wheel speed sensor 10 and the vehicle body speed, the control system stops the output of correction toque calculated from the wheel speeds, and thereby prevents unpleasant vibration from being transmitted to the driver by the correction torque calculated from the wheel speed deviated from the actual wheel speed.

As explained above, the control system according to the first embodiment can provide following effects and advantages.

(1) A vibration restraining control system comprises: driving force controlling means or device 60 and braking force controlling means or device 70 (hereinafter referred to as a driving/braking torque producing means or device) to produce a driving/braking torque of a wheel; and a means or device to calculate a first correction toque Tw_fb to suppress a sprung vibration of the vehicle in accordance with a wheel speed Vw (first correction torque calculating means or device); to calculate a second correction toque Tw_ff to suppress the sprung vibration of the vehicle in accordance with a driving/braking torque (a second correction torque calculating means or device), and to output, as a correction torque command dTw*, to the driving/braking force producing means, a correction toque Tw_stab obtained by assigning weights to the first correction torque Tw_fb and the second correction torque Tw_ff in accordance with a traveling state (an input signal selecting means or device 56, an input signal processing means or device 55).

Thus, since reliability of the sprung vibration estimated from the wheel speed and the reliability of the sprung vibration estimated from the driving/braking torque are varied in dependence on the vehicle traveling state, the control system can perform an adequate driving force correction by varying the weight of an adequate vibration damping torque and the weight of an inadequate vibration damping torque.

(2) The input signal processing means 55 is configured to make the weight C_wheel assigned to the first correction toque smaller than the weight C_engtrq assigned to the second correction toque when the vehicle speed is lower than or equal to a predetermined vehicle speed value (Va or Vb). Concretely, weight C_wheel is set equal to zero whereas weight C_engtrq is held at one. Therefore, the control system can prevent the vibration damping torque from being calculated from the sensed wheel speed deviated from the actual wheel speed in a very low vehicle speed region in which the sensing accuracy of the wheel speed sensor is low, and thereby prevent execution of inadequate driving force correction.

(3) The input signal processing means 55 is configured to set the weight assigned to the first correction toque to zero and set the weight assigned to the second correction toque to one when the weight C_wheel assigned to the first correction toque is made smaller than the weight C_engtrq assigned to the second correction toque. Thus, by eliminating influence of the first correction torque based on the wheel speed which is liable to make the driving force correction inadequate, the control system can perform the driving force correction properly.

Embodiment 2

Figure 13:
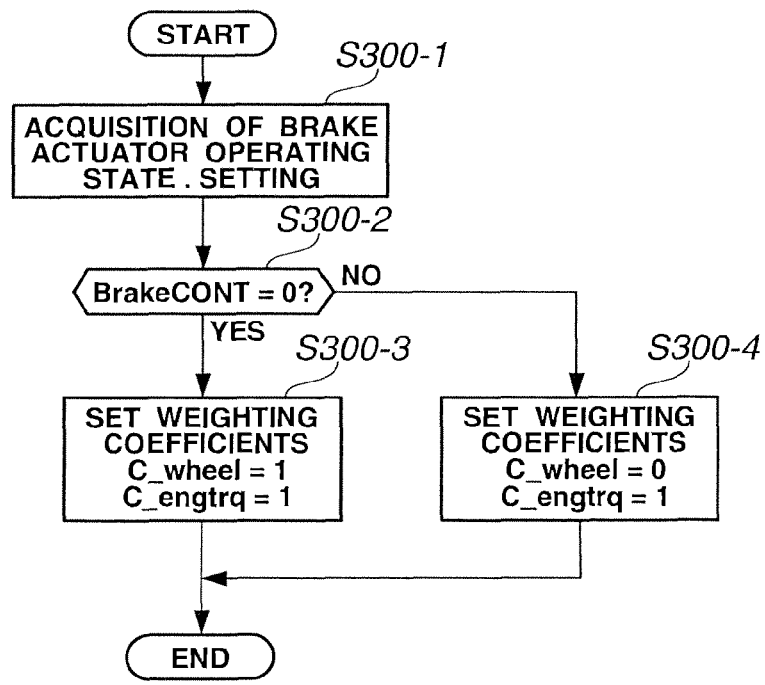
FIG. 13 is a flowchart showing a weighting coefficient setting process according to a second embodiment.

Following is explanation on a second embodiment. Since the basic construction is the same as the first embodiment, the following explanation is directed only to points different from the first embodiment. FIG. 13 is a flowchart showing a weighting coefficient setting process according to the second embodiment.

At a step S300-1, the controller acquires or obtain an operating state of an brake actuator control (such as VDC, TCS, ABS, EBD etc.). VDC is an abbreviation of vehicle dynamics control which is a control to stabilize a vehicle cornering behavior (yaw rate, etc.). TCS is an abbreviation of traction control system to restrain slip due to excessive torque applied to a driving wheel. ABS is an abbreviation of anti-lock brake system to avoid wheel lock at the time of hard braking. EBD is an abbreviation of electronic brake force distribution system to optimize the front and rear wheel brake force distribution to prevent rear wheel lock at the time of braking. Each of these controls is a control performed when the wheel speed and the vehicle body speed deviate or separate from each other, and a slip quantity becomes greater than or equal to a predetermined value. When any of these controls is operative, then the controller sets a brake control flag BrakeCONT to one. When none of these controls are operative, then the controller sets the brake control flag BrakeCONT to zero.

Figure 14:
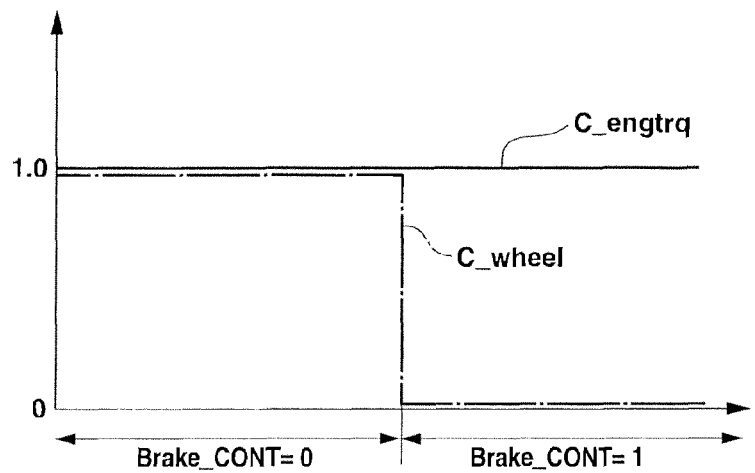
FIG. 14 is a view showing a weight setting map in the second embodiment.
Figure 15:
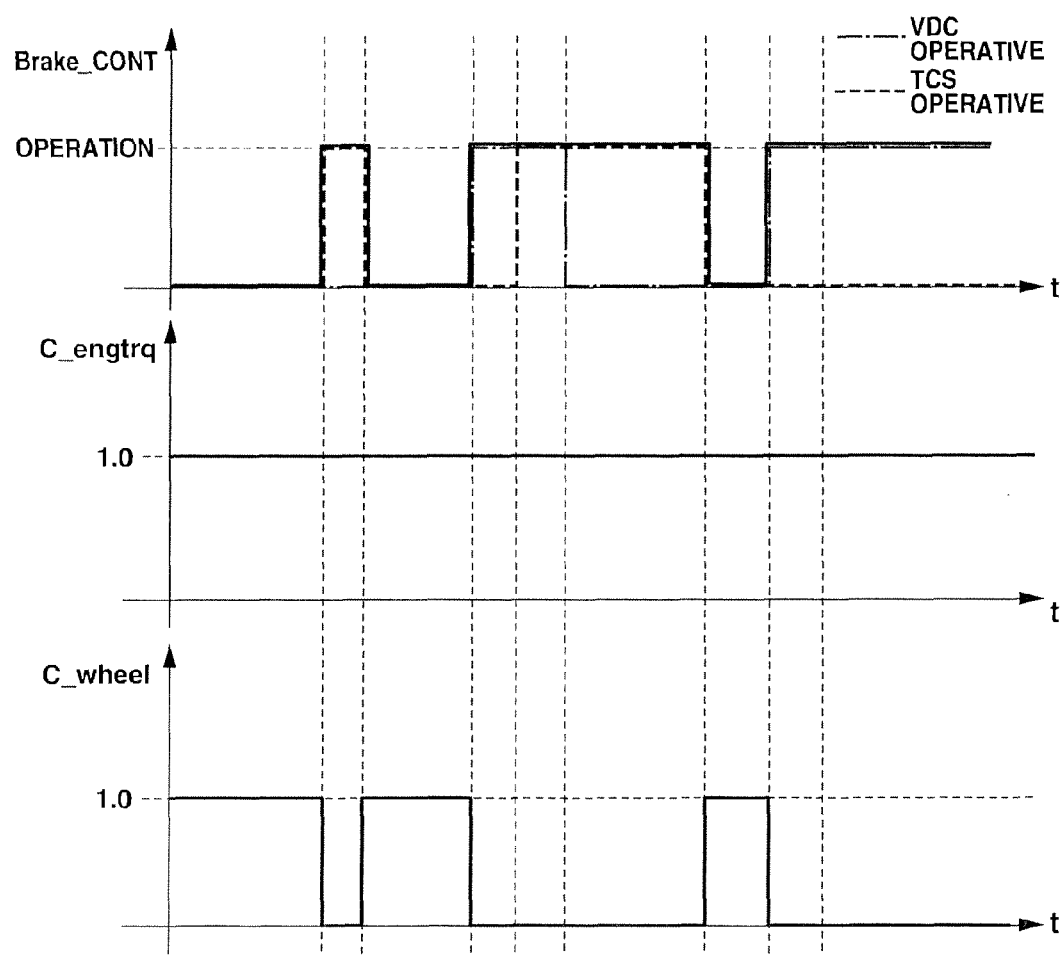
FIG. 15 is a time chart illustrating a weight setting process in the second embodiment.

At a step S300-2, the controller uses the brake actuator control operation information obtained at S300-1, and proceeds to a step S300-3 when BrakeCONT is zero. At S300-3, the controller sets the weight C_wheel for the wheel speed to one, and sets the weight C_engtrq for the engine torque to one. Then, the controller terminates the process of FIG. 13. When BrakeCONT is one, the controller proceeds to a step S300-4, and the controller sets the weight C_wheel for the wheel speed to zero, and the weight C_engtrq for the engine torque to one. Then, the controller terminates the process of FIG. 13. FIG. 14 shows a weight setting map of the second embodiment, and FIG. 15 is a time chart showing operations in the weight setting process of the second embodiment. The weight C_engtrq is always set equal to one irrespective of the operating state of the brake actuator. On the other hand, the weight C_wheel for the wheel speed is set equal to zero when the brake actuator control such as VDC and TCS is operated and hence Brake_CONT is one, and set equal to one when Brake_CONT is zero.

As explained above, the second embodiment can provide following effects and advantages in addition to the effects (1)~(3) of the first embodiment.

(4) The input signal processing means 55 is configured to make the weight C_wheel assigned to the first correction toque smaller than the weight C_engtrq assigned to the second correction toque when the wheel slip quantity is greater than or equal to a predetermined value. Concretely, the weight C_wheel is set equal to zero whereas the weight C_engtrq is held at one. Thus, the control system can prevent the vibration suppressing torque from being calculated on the basis of the sensed wheel speed deviated from the actual wheel speed when the wheel slip quantity is relatively greater as in a vehicle starting operation and a low vehicle speed operation, and thereby prevent an inadequate driving force correction.

Although the preceding explanation is directed to the certain embodiments, it is optional to employ other concrete constructions. For example, it is optional to employ various other methods for setting the weight although, in the first embodiment, weight C_wheel is set to zero or one whereas weight C_engtrq is constantly set at one. Further embodiments are explained below as example.

Figure 16:
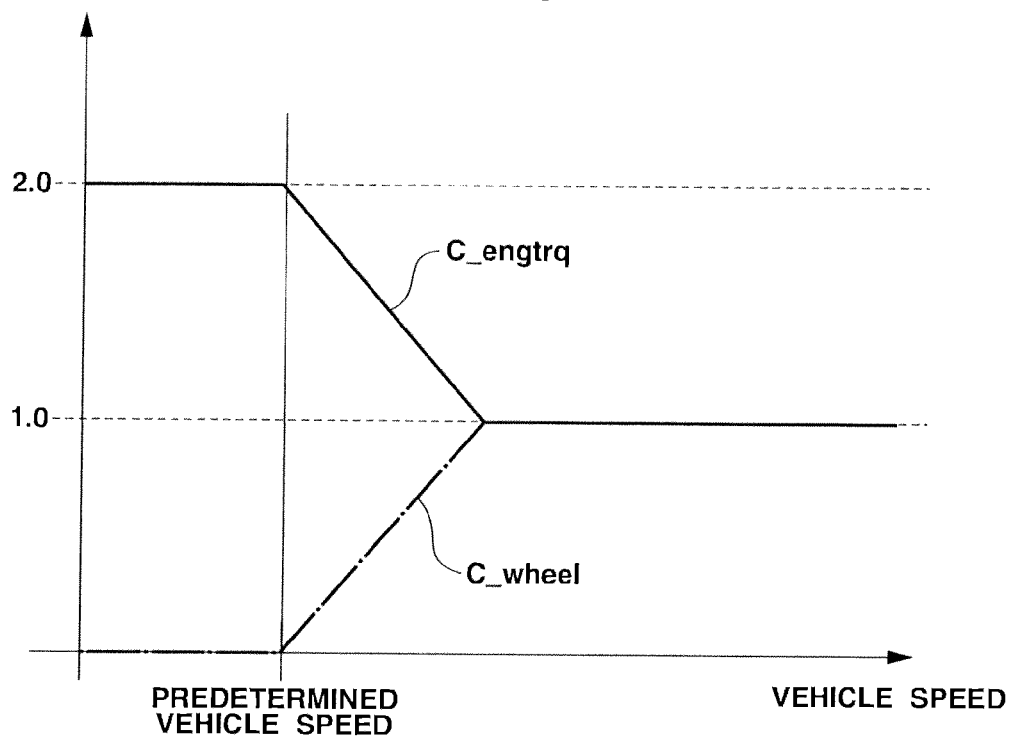
FIG. 16 is a view showing a weight setting map in a further embodiment.

FIG. 16 shows a weight setting map according to a further embodiment. The input signal processing means or device 55 sets the weight C_wheel for the first correction torque, to zero, and the weight C_engtrq to 2 when the vehicle speed is lower than or equal to a predetermined vehicle speed value representing a very low speed. In the very low speed region, sprung vibration due to the driving torque exerts great influence. The control system can reduce the influence of occurrence of the sprung vibration due to the driving torque, in addition to the effects of the first embodiment.

Figure 17:
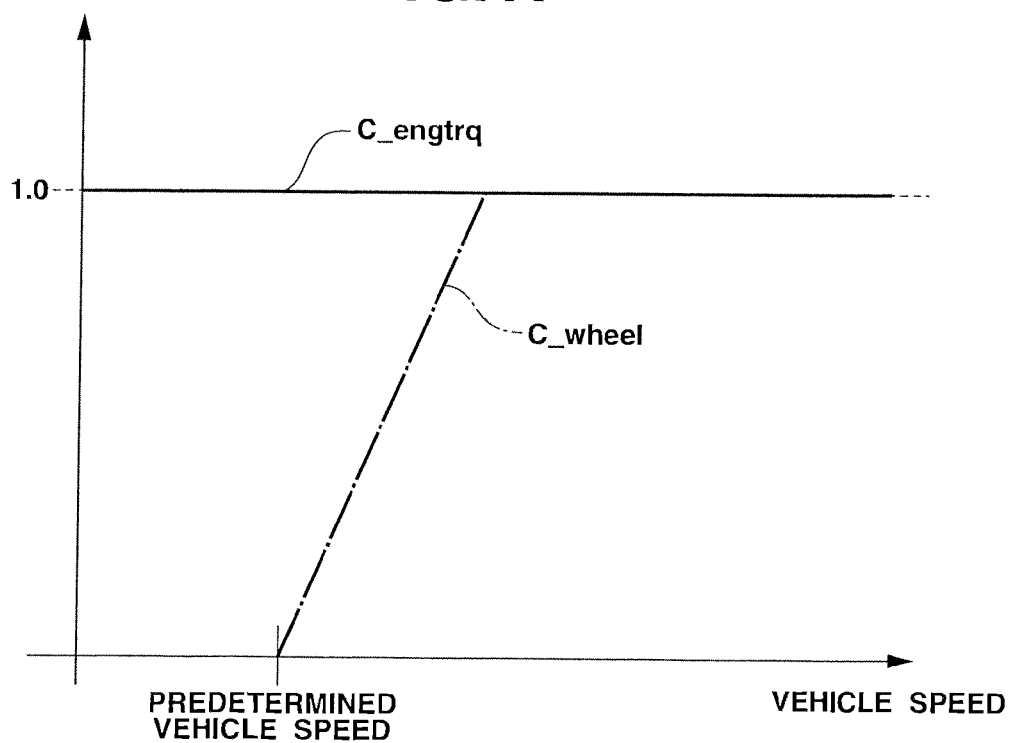
FIG. 17 is a view showing a weight setting map in a further embodiment.

FIG. 17 shows a weight setting map according to a further embodiment. The input signal processing means or device 55 sets the weight C_wheel for the first correction torque, to zero, and the weight C_engtrq to 1 when the vehicle speed is lower than or equal to a predetermined vehicle speed value representing a very low speed. When the vehicle speed increases beyond the predetermined speed value, the input signal processing means 55 increases the weight C_wheel gradually. By so doing, the control system can prevent sharp increase of the first correction torque, restrain an abrupt change of the correction torque, and thereby achieve stable vibrating damping control.

Figure 18:
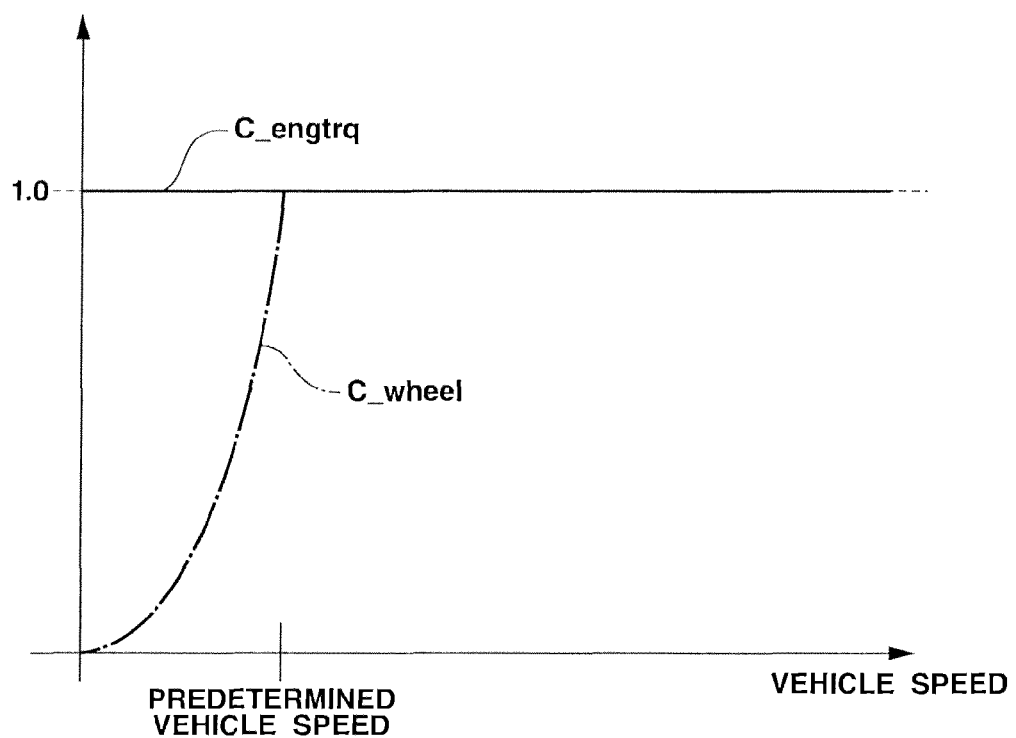
FIG. 18 is a view showing a weight setting map in a further embodiment.

FIG. 18 shows a weight setting map according to a further embodiment. In the vehicle speed region higher than a predetermined vehicle speed value representing a very low vehicle speed, the input signal processing means or device 55 sets the weight C_wheel for the first correction torque, to one. In the vehicle speed region lower than the predetermined speed value, the input signal processing means or device 55 decreases the weight C_wheel as the vehicle speed becomes lower because the reliability becomes lower due to delay etc., as the vehicle speed becomes lower. In the example of FIG. 18, the weight C_wheel is decreased along a curve which is convex downwards. Accordingly, the control system can prevent abrupt change of the correction toque, restrain output of an inadequate correction toque simultaneously and achieve a stable vibration damping control.

Figure 19:
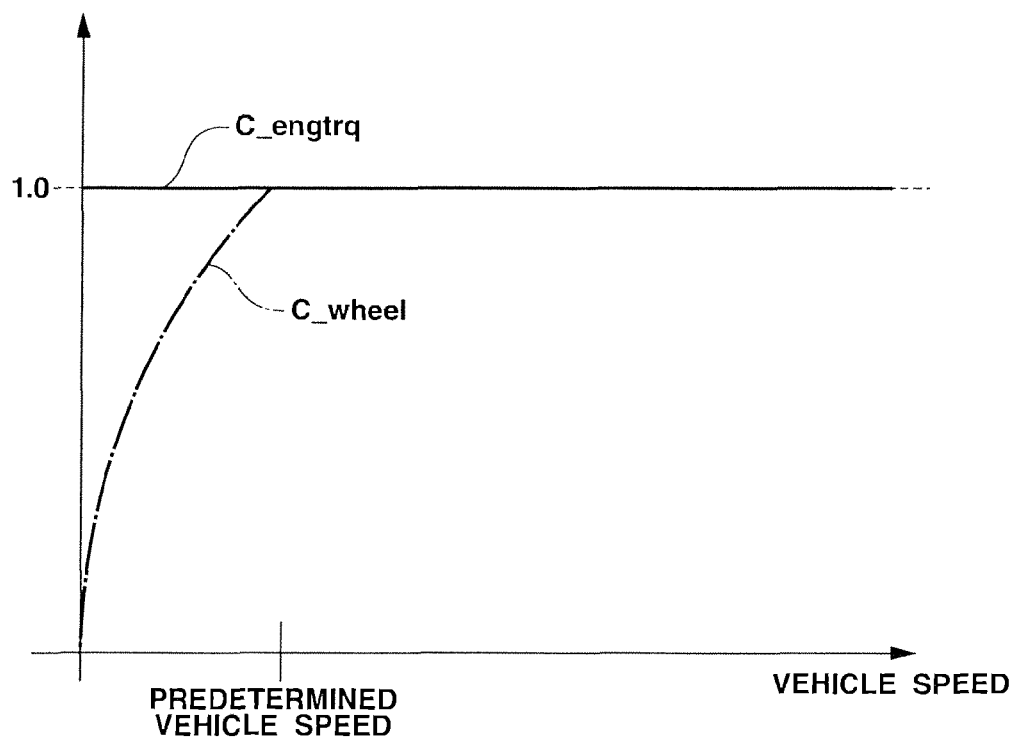
FIG. 19 is a view of a weight setting map according to a further embodiment.

FIG. 19 shows a weight setting map according to a further embodiment. In the vehicle speed region higher than a predetermined vehicle speed value representing a very low vehicle speed, the input signal processing means or device 55 sets the weight C_wheel for the first correction torque, to one. In the vehicle speed region lower than the predetermined speed value, the input signal processing means or device 55 decreases the weight C_wheel as the vehicle speed becomes lower because the reliability becomes lower due to delay etc., as the vehicle speed becomes lower. In the example of FIG. 19, the weight C_wheel is decreased along a curve which is convex upwards. Accordingly, the control system can perform the vibration damping control in a wider range by increasing the weight in the region where the delay is smaller.

Although explanation is given to the embodiments in which the present invention is applied to the vibration damping control apparatus, various other constructions other than the weight setting map are included in the present invention. For example, the vehicle may be a hybrid vehicle including a motor, or an electric vehicle using only a motor as the driving source although the embodiments employ the construction equipped with the engine that is an internal combustion engine as a driving source of the driving/braking torque producing means or device.

Moreover, as a brake actuator of the driving/braking torque producing means or device, the illustrated construction is arranged to produce a braking force by pressing a caliper with a brake pad. However, it is optional to utilize a regenerative braking force of a motor or the like. Furthermore, instead of a hydraulic brake, it is possible to employ a construction including an electric caliper. In the case of the electric vehicle including a motor/generator, the driving/braking torque producing means or device includes only the motor/generator. Therefore, it is possible to output a signal combining the driving torque and braking torque in the form of a torque signal supplied to the motor/generator.

The illustrated embodiments employ the construction which uses the front and rear two-wheel model having the front and rear suspensions with respect to the vehicle body, and which calculates the correction torque to suppress pitching vibration and bouncing vibration of the vehicle. However, for example, it is possible to employ the construction using a four wheel model, and calculating the correction torque to suppress rolling vibration as well as the pitching vibration and bouncing vibration.

The invention claimed is:

1. A vibration restraining control apparatus for a vehicle, the vibration restraining control apparatus comprising:
   a driving/braking torque producing device to produce a driving/braking torque in a wheel;
   a first correction torque calculating device to calculate a first correction torque to suppress a sprung vibration of the vehicle in accordance with a wheel speed;
   a second correction torque calculating device to calculate a second correction torque to suppress the sprung vibration of the vehicle in accordance with a driving/braking torque;
   an input signal processing device to calculate a correction torque command by assigning weights in accordance with a traveling state and to output the correction torque command to the driving/braking torque producing device; and
   a wheel speed sensing device to sense the wheel speed;
   the vibration restraining control apparatus is arranged to vary the weight to the first correction torque to make smaller the weight of the first correction torque when the traveling state is in a condition in which a deviation between a sensed wheel speed and an actual wheel speed becomes greater, than the weight of the first correction torque when the traveling state is not in the condition.

2. The vibration restraining control apparatus as claimed in claim 1, wherein the input signal processing device is configured to make the weight to the first correction torque smaller than the weight to the second correction torque when a vehicle speed is lower than or equal to a predetermined vehicle speed value.

3. The vibration restraining control apparatus as claimed in claim 1, wherein the input signal processing device is configured to make the weight to the first correction torque smaller than the weight to the second correction torque when a wheel slip quantity is greater than or equal to a predetermined value.

4. The vibration restraining control apparatus as claimed in claim 1, wherein the input signal processing device is configured to make the weight to the first correction torque smaller than the weight to the second correction torque when the vehicle is started.

5. The vibration restraining control apparatus as claimed in claim 2, wherein the input signal processing device is configured to set the weight to the first correction torque to zero and set the weight to the second correction torque to one when the weight to the first correction torque is made smaller than the weight to the second correction torque.

* * * * *